US012374064B2

(12) United States Patent
Randles et al.

(10) Patent No.: US 12,374,064 B2
(45) Date of Patent: Jul. 29, 2025

(54) AUGMENTED REALITY SYSTEM INCLUDING CORPORAL TACTILE DEVICES

(71) Applicant: University of Central Florida Research Foundation, Inc., Orlando, FL (US)

(72) Inventors: Christopher Randles, Orlando, FL (US); Ryan McMahan, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 19/013,709

(22) Filed: Jan. 8, 2025

(65) Prior Publication Data
US 2025/0148728 A1    May 8, 2025

Related U.S. Application Data

(63) Continuation of application No. PCT/US2024/037559, filed on Jul. 11, 2024.
(Continued)

(51) Int. Cl.
*G06T 19/00*     (2011.01)
*G06F 3/01*      (2006.01)
*G06F 3/16*      (2006.01)

(52) U.S. Cl.
CPC ............ *G06T 19/006* (2013.01); *G06F 3/016* (2013.01); *G06F 3/16* (2013.01)

(58) Field of Classification Search
CPC .............................. G06T 19/006; G06F 3/016
See application file for complete search history.

(56) References Cited

U.S. PATENT DOCUMENTS

2017/0169617 A1    6/2017    Rodriguez, II
2019/0318659 A1   10/2019    Hamadani et al.
(Continued)

OTHER PUBLICATIONS

Written Opinion of the International Searching Authority for PCT/US2024/037559 with an International filing date of Jul. 11, 2024, and a mailing date of Oct. 18, 2024.
(Continued)

*Primary Examiner* — Jeffery A Brier
(74) *Attorney, Agent, or Firm* — Anton J. Hopen; Smith & Hopen, P.A.

(57) ABSTRACT

The present invention relates to an advanced augmented reality, AR, apparatus featuring a video see-through AR, VST-AR, device that captures images of a real-world environment and displays augmented versions on a screen. The system includes a corporal entity, such as an empty laboratory vessel, equipped with a unique identification marker. This marker provides real-time spatial data for generating visual augmentations representing virtual matter within the vessel. The apparatus integrates various sensors, including an inertial measurement unit, IMU, capacitive tactile sensors, and a thermal diode, to dynamically adjust visual augmentations based on user interactions. Additional sensory enhancements include an olfactory output fan, an eccentric rotating mass, ERM, motor, and auditory outputs. Wireless connectivity via IEEE 802.11 (Wi-Fi) and IEEE 802.15.1 (Bluetooth) ensures seamless communication between components. This AR system is particularly valuable for educational and laboratory settings, offering realistic, interactive simulations.

22 Claims, 9 Drawing Sheets

Related U.S. Application Data

(60) Provisional application No. 63/513,191, filed on Jul. 12, 2023.

(56) References Cited

U.S. PATENT DOCUMENTS

| | | |
|---|---|---|
| 2019/0392218 A1 | 12/2019 | Rad |
| 2020/0160750 A1* | 5/2020 | LiKamWa .............. G06T 13/20 |
| 2021/0304886 A1 | 9/2021 | Suter et al. |
| 2023/0419614 A1 | 12/2023 | Lam et al. |

OTHER PUBLICATIONS

Menikrama M.R.L.Y et al. ARChem:Augmented Reality Chemistry Lab. 2021 IEEE 12th Annual Information Technology, Electronics and Mobile Communication Conference (IEMCON). 2021, pp. 0276-0280.

André Graute et al. ARChemLab Augmented and Mixed Reality in Chemistry Labs for Education. Project Group Presentation, Summer Term 2023, Heinz Nixdorf Institut Universitat Paderborn. 2023.

Augmented and Mixed Reality in Chemistry Labs for Education, Heinz Nixdorf Institut: Augmented and Mixed Reality in Chemistry Labs for Education. https://www.hni.uni-paderborn.de/alg/teaching/ss23/archemlab/ Last accessed Mar. 16, 2023.

\* cited by examiner

AUGMENTED REALITY SYSTEM INCLUDING CORPORAL TACTILE DEVICES

PRIORITY CLAIM

This application is the National Stage of International Application No. PCT/US2024/037559, filed Jul. 11, 2024, which claims priority to U.S. Provisional Patent Application No. 63/513,191 filed Jul. 12, 2023 entitled "Augmented Reality System Including Corporal Tactile Devices."

BACKGROUND OF THE INVENTION

1. Field of the Invention

This invention relates, generally, to augmented reality systems. More specifically, it relates to an augmented reality system including multifunctional corporal entities that are augmented through a video see-through augmented reality system while providing tactile, sensing, and stimuli-producing outputs for a system user.

2. Brief Description of the Prior Art

Traditionally, training and education (particularly courses and modules that required a hands-on approach) occurred in an exclusively in-person setting. For example, students and professionals engaging in modules relating to chemical reactions must meet in a laboratory setting that includes the required equipment and raw materials. As such, while baseline knowledge of underlying properties and relationships can be gained within a remote or distanced setting (such as by reading books and treatises, or attending a course via a multimedia output), interactive knowledge is typically limited to in-person and hands-on settings.

Such in-person and hands-on settings provide students with the ability to physically interact with tools, equipment, and raw materials to gain an understanding of their physical, chemical, electrical, tactile, and other interactable properties. For example, within a chemistry laboratory setting, a student can mix different chemicals together within a piece of glassware to note any changes resulting from the mixture while developing fine motor skills required to interact with sensitive and fragile materials. However, such in-person instruction and interaction are both costly and potentially dangerous for those within the laboratory setting. For example, there is a cost associated with using and replenishing raw materials (such as chemicals and other physical substances) used within the laboratory; there are also costs associated with maintaining and replacing equipment and tools, particularly those which frequently break (such as thin glassware used in heat transfer reactions). In addition, there is risk and danger associated with using strong chemicals in reactions, as well as in glassware breaking during use by a student. Furthermore, waste management and waste remediation pose significant challenges, as the disposal of chemical waste requires careful handling, adherence to regulatory standards, and substantial financial investment. Improper disposal can lead to environmental contamination and health hazards, making the process both a logistical and ethical concern for educational institutions.

Attempts have been made to provide simulations of settings such as laboratory settings. For example, existing simulation techniques typically use optical see-through augmented reality (OST-AR) which uses transparent optical combiners to combine light naturally reflected by real-world objects to the user's eyes, as well as light projected into the combiners to represent any visual objects or information intended to augment the real-world objects. OST-AR techniques commonly suffer from semi-transparent visualizations of virtual objects that should instead be opaque; small display fields of view (FOVs) due to the limitations of optical combiners; and small tracking FOVs due to poor positioning of external sensors and cameras (for example, some devices are only capable of tracking user body parts that are placed directly in front of the user's face).

In addition, such simulations typically remove the tactile component of a traditional laboratory setting. As such, a full simulation prevents the user from developing fine motor skills that are imperative to successfully performing experiments in a real-life setting, such as mixing chemicals within a glass, placing a crucible pan on a thin suspension wire, or simply placing a fragile glass on a workbench. Without physically interacting with laboratory components or a sufficient replica, the use of purely virtual objects reduces the capacity of a student to learn and develop fine motor skills, thereby limiting the usefulness of such training.

Accordingly, what is needed is an augmented reality system including corporal tactile entities that are augmented by the augmented reality system while providing sensing and stimuli-producing outputs for a user. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

BRIEF SUMMARY OF THE INVENTION

The long-standing but heretofore unfulfilled need for augmented reality system including corporal tactile entities that are augmented by the augmented reality system is now met by a new, useful, and nonobvious invention.

The present invention relates to an advanced augmented reality (AR) apparatus that integrates various technologies to provide an enhanced user experience through visual, tactile, and other sensory feedback mechanisms. This apparatus, featuring video see-through augmented reality (VST-AR) capabilities, leverages both hardware and software components to achieve a realistic and interactive environment, particularly useful in educational and laboratory settings.

The AR apparatus comprises a VST-AR device that captures images of the real-world environment and displays augmented versions of those images on a display screen. This device includes one or more external-facing cameras to capture the user's surroundings and process these images to overlay digital content, providing an augmented view. The display can be part of a headset, eyeglasses, or any wearable device that offers visual feedback.

A key component of this system is the corporal entity, a physical analog of an otherwise empty laboratory vessel. These vessels can include beakers, pipettes, or any laboratory instrument, designed to be durable and cost-efficient, often made from plastic rather than other fragile materials including, but not limited to, glass vessels. The physical vessel incorporates a unique identification marker, such as a QR code, RFID tag, or NFC chip, affixed to its surface. This marker is associated with the corporal entity and can be optically (or wirelessly in the case of RFID/NFC) retrieved by the VST-AR device to initialize and update the spatial position and orientation of the vessel.

A processor communicatively coupled to the VST-AR device and a data store retrieves operational parameters stored in the data store using the decoded marker as a key. These parameters define how the augmentation for the physical vessel is rendered on the display screen. The spatial registration module accessible by the processor ensures that the unique identification marker provides real-time data on the vessel's position and orientation. This module allows the AR system to generate visual augmentations representing virtual matter, such as liquids or solids, within the vessel, ensuring that these augmentations align perfectly with the physical vessel.

The augmentations are dynamic and re-rendered in real-time based on changes in the spatial position or orientation of the physical vessel. This is crucial for applications where accurate tracking and representation of the vessel's contents are necessary, such as in laboratory simulations. The use of a machine-readable code for initial spatial registration ensures that even if the code is occluded during use, the system can maintain accurate tracking using other sensors.

An enhancement to the AR apparatus is the inclusion of an inertial measurement unit (IMU) physically affixed to the vessel. The IMU comprises an accelerometer, gyroscope, and magnetometer, which work together to detect the vessel's orientation and movement. This data is sent to the processor, allowing for dynamic adjustments of the visual augmentations. For instance, when a user tilts or shakes the vessel, the virtual liquid within can react realistically, mimicking the expected behavior of real liquids.

Capacitive tactile sensors are another integral component, affixed to the vessel's exterior to detect user touch. These sensors measure changes in capacitance caused by the human body's conductive properties, providing feedback to the VST-AR device. This feedback can enhance the visual augmentations with tactile responses, such as simulating the feel of holding a hot or cold object or detecting the pressure applied during a task.

A thermal diode integrated into the vessel simulates temperature changes, providing tactile feedback that represents exothermic or endothermic reactions. This feature is particularly useful in educational settings where understanding the thermal properties of reactions is critical. The thermal diode can quickly adjust the vessel's surface temperature, providing realistic, but safely limited heat sensations to the user.

To further enhance the sensory experience, the AR apparatus includes an olfactory output fan within the vessel. This fan can emit scents synchronized with the visual augmentations, such as the smell of chemicals or other substances. This olfactory feedback adds another layer of realism, making the simulation more immersive yet providing a safe experience without the risk of inhaling dangerous substances.

The inclusion of an eccentric rotating mass (ERM) motor within the vessel allows for the generation of vibrations. These vibrations simulate tactile sensations, such as stirring or mixing fluids, enhancing the user's interaction with the virtual environment. The ERM motor is finely controlled to produce varying intensities and patterns of vibration, simulating different tactile experiences.

Auditory augmentation is also provided, with sound output mechanisms configured to emit audio corresponding to the visual augmentations. This includes sounds of liquid pouring, chemical reactions, or collisions between objects, enhancing the multi-sensory experience. Spatial audio rendering ensures that sounds are accurately positioned in the augmented environment, adding to the realism.

A fluid flow system comprising a fluid reservoir and a bidirectional pump is included to simulate weight changes within the vessel. Fluid can be pumped in or out of the vessel, altering its weight to match the visual representation of adding or removing liquids. The vessel retains the fluids impermeably, ensuring that no spills occur even if the vessel is inverted. This feature allows users to practice precise liquid handling techniques without the risk of actual spills.

Wireless connectivity is a feature of this AR apparatus, enabling seamless communication between the VST-AR device and the corporal entity. Various wireless protocols defined by IEEE standards, such as Bluetooth, Wi-Fi, and NFC, facilitate this communication. For the AR system described, IEEE 802.11 (Wi-Fi) and IEEE 802.15.1 (Bluetooth) are the most relevant standards, providing the necessary wireless communication protocols to enable seamless connectivity between the VST-AR device and the corporal entity. For instance, the IMU data and capacitive touch sensor information can be transmitted wirelessly to the processor, ensuring real-time updates and responsive interactions.

For laboratory instruments like micro-pipettes, the AR apparatus provides specialized enhancements. Capacitive tactile sensors detect user touch and grip, while piezoelectric pressure sensors measure the force applied during liquid transfer. Mechanical pressure sensors provide precise feedback on the amount of pressure exerted on the pipette tip. These sensors ensure that virtual simulations closely mimic real-world operations, providing valuable training and practice opportunities.

The unique identification marker on each vessel or instrument is useful for the system's functionality. It not only identifies the type of vessel but also retrieves its operational parameters from the data store. These parameters include details such as the vessel's capacity, material properties, and specific augmentations required. The spatial registration module uses this information to ensure accurate and realistic augmentations, adjusting them dynamically based on user interactions.

The present invention offers a comprehensive AR apparatus that integrates visual, tactile, auditory, and olfactory feedback to provide an immersive and realistic user experience. The system's ability to dynamically track and augment physical vessels and instruments makes it particularly valuable for educational and training applications, offering a safe and cost-effective alternative to traditional laboratory settings. By leveraging advanced sensors, wireless connectivity, and sophisticated rendering techniques, this AR apparatus enhances the user's ability to interact with and learn from virtual simulations in a highly engaging manner.

An object of the invention is to augment a virtual representation of a physical corporal entity that is interactable by a user, such that the user not only views an augmented reality, but also simultaneously physically interacts with an object. Another object of the invention is to provide a safe method of instruction and learning for potentially dangerous and costly subjects, such as chemistry laboratory settings, via a combined augmented reality system. Additionally, the invention addresses temporal and geographic constraints associated with traditional lab and training systems, enabling students and trainees to engage in interactive and immersive learning experiences regardless of their physical location or time zone. This flexibility allows for continuous and accessible education, reducing the need for centralized, time-bound, and location-specific resources while maintaining the quality and safety of hands-on training.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
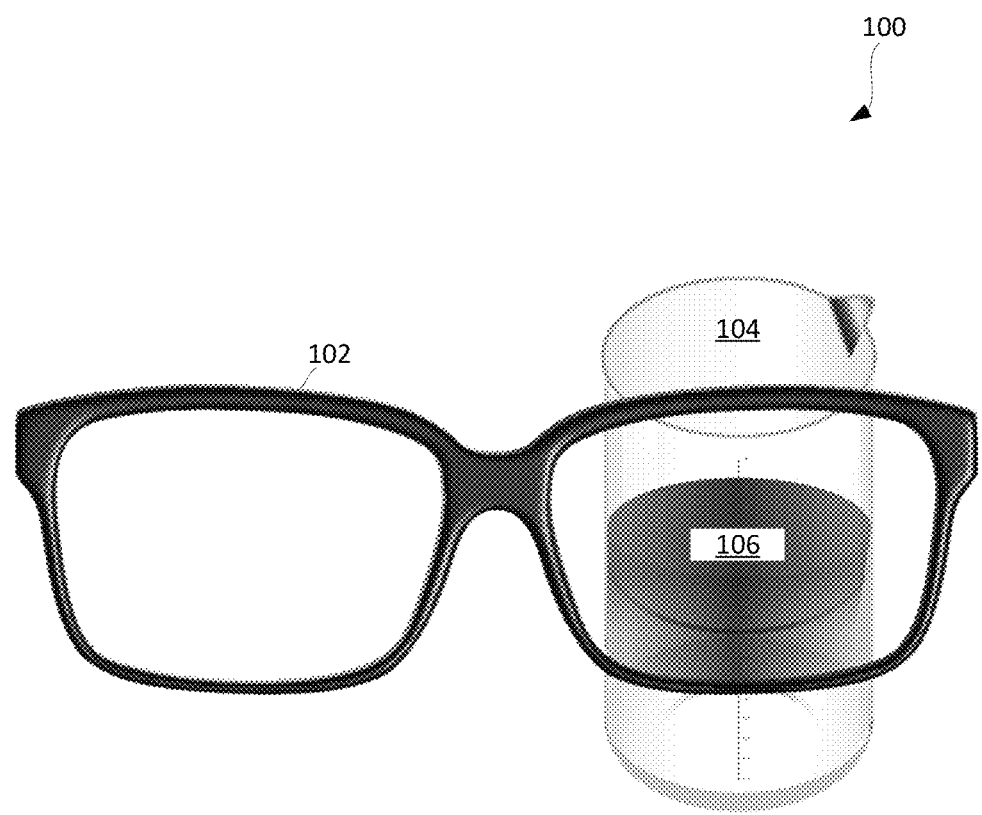
FIG. 1 is perspective view of a combined augmented reality system including an augmented reality component and a corporal entity, showing an augmentation of a portion of the corporal entity, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a combined augmented reality (AR) system featuring a video see-through augmented reality (VST-AR) component and multifunctional corporal entities. The multifunctional corporal entities are augmented via the VST-AR component to provide tactile, sensing, and stimuli-producing outputs based on user interactions. The combined AR system leverages the VST-AR component by utilizing one or more external-facing cameras to capture images of the user's real-world environment. These captured images are then processed to display augmented versions on one or more visual screens in front of the user's eyes, thereby providing an augmented view of the real world.

A first key feature of the present invention, referred to by the inventors as CLEAR (Combined Learning and Educational Augmented Reality), is its use of VST-AR. Unlike optical see-through AR (OST-AR), which employs transparent optical combiners to merge light naturally reflected by real-world objects with light projected to represent virtual objects, VST-AR captures the real-world environment through cameras and displays the augmented images on screens. This fundamental difference offers several advantages. VST-AR can provide pure opacity for virtual objects because it directly augments the pixels of real-world images before displaying them. This results in more realistic and immersive experiences as virtual objects do not appear semi-transparent. Furthermore, VST-AR systems often support wider fields of view (FOV) because they use high-resolution mobile displays, enhancing the user's peripheral vision and overall immersive experience.

In contrast, OST-AR systems face limitations. They often suffer from semi-transparent visualizations of virtual objects that should appear opaque, diminishing the realism of the augmented experience. Additionally, the display FOV in OST-AR systems is typically narrower due to the constraints of optical combiners, limiting the user's immersive experience. The tracking FOV is also reduced in OST-AR systems because external sensors and cameras are often poorly positioned, restricting the tracking capabilities to hands or objects placed directly in front of the user's face. For example, the MICROSOFT HOLOLENS 2 can only track hands that are directly in front of the user, limiting the range of interactions and gestures.

Commercial VST-AR devices that are currently available or expected to be available in the near future include those sold under the brand names META QUEST PRO, META QUEST 3, and APPLE VISION PRO. These devices not only offer video see-through capabilities but also provide advanced sensing capabilities, such as head tracking, hand tracking, and environment tracking. These features enable the AR system to accurately map the user's surroundings and interactions, creating a more engaging and responsive experience.

META QUEST PRO, for instance, utilizes advanced sensors to track the user's head movements, allowing the virtual environment to adjust dynamically based on where the user is looking. Hand tracking enables users to interact with virtual objects using natural gestures, enhancing the intuitive nature of the AR system. Environment tracking maps the user's physical space, ensuring that virtual objects are accurately placed within the real world. Similarly, the APPLE VISION PRO offers high-resolution displays and precise tracking capabilities, making it suitable for detailed and immersive AR experiences.

In addition to the VST-AR component, the combined AR system employs one or more multifunctional corporal entities. These corporal entities provide a tactile and physical component for user interaction, enhancing the realism and educational value of the AR experience. The corporal entities are augmented and displayed via the VST-AR component, allowing users to interact with both the virtual and physical aspects of the simulation seamlessly. For example, a corporal entity could be a laboratory beaker that is physically present and augmented with virtual liquids and reactions displayed on the VST-AR device.

A second key feature of CLEAR is the use of low-cost, multifunctional corporal entities that can be tracked and augmented by the VST-AR while also providing additional sensing capabilities and stimuli-producing capabilities to provide high-fidelity simulations of educational experiences. The corporal entities can be manufactured, or 3D printed at a fraction of the cost of their conventional counterparts. Because the VST-AR will be used to augment the entities and simulate the educational experiences, the corporal entities do not need to maintain the same properties or be made of the same materials (e.g., glass) as their conventional counterparts. Hence, the corporal entities can be manufactured, or 3D printed using plastics, which are cheaper and less likely to break. See Table 1 below for example estimates.

TABLE 1

Example estimates of plastic replicas compared to their glassware counterparts.

| Entity | Glassware Cost | Plastic Replica |
|---|---|---|
| 50 mL Pyrex serialized/certified Class A Burets | $461.00 | $2.52 |
| Liebig Condenser | $113.00 | $1.71 |
| 50 mL Pyrex Class A Volumetric Flasks | $70.25 | $0.76 |
| 50 mL Pyrex round bottom flask | $57.25 | $1.13 |
| 50 mL Pyrex beaker | $8.25 | $0.62 |
| 125 ml Pyrex Erlenmeyer Flask | $6.80 | $2.00 |

As shown in FIG. 1, combined AR system 100 includes VST-AR device 102 and at least one corporal entity 104, in this case a laboratory beaker. VST-AR device 102 includes one or more external-facing cameras to capture images of the user's real-world environment, such as corporal entity 104 (as shown in FIG. 1). VST-AR device 102 also displays augmented versions of those images on one or more visual screens in front of the user's eyes, thereby providing an augmented view of the real world. For example, as shown in FIG. 1, VST-AR device 102 displays augmentation 106 of corporal entity 104 within the display of VST-AR device 102. As such, VST-AR device 102 (as opposed to OST-AR) provides pure opacity for augmentation 106 by directly augmenting the pixels of the real-world images before displaying the images; in addition, embodiments of VST-AR device 102 provide a wider display field of view (FOV) due to the use of high-resolution mobile displays. Embodiments of VST-AR device 102 include full headsets, partial headsets, eyeglasses, and other mobile and wearable devices that provide visual feedback to a user of VST-AR device 102.

In terms of tracking the corporal entities to afford registration of the virtual representation and corporal entity, there are several potential embodiments. One basic yet effective approach is to manufacture or print the corporal entities with fiducial markers embedded into them (see FIG. 1) and then use basic AR libraries (e.g., ARCore, Vuforia) or computer vision libraries (e.g., OpenCV) to track the markers and register the virtual representations with them. Fiducial markers are highly effective in providing distinct visual features that can be easily detected and tracked by AR systems. By incorporating these markers directly into the corporal entities, the system can maintain accurate tracking even as the user interacts with the objects. Multiple fiducial markers can be printed on a single corporal entity to reduce the likelihood of a single marker being occluded by the user's hand when the entity is picked up. This redundancy ensures continuous tracking and seamless integration of virtual and physical elements within the AR environment.

Other embodiments for tracking the corporal entities include embedding constellations of infrared lights onto the surface of the entities and using external infrared cameras to trilaterate the positions of the entities within the space. This method is similar to how the OCULUS RIFT CVI's tracking system worked, where multiple infrared LEDs are placed on the device, and external sensors calculate their positions through triangulation. This technique allows for precise tracking over a larger area and can be particularly useful in complex AR environments where multiple entities are being used simultaneously.

Similarly, infrared light sensors could be embedded into the surface of the entities, and external infrared light emitters can be used to sweep across the tracking space at a known frequency to trilaterate the positions of the entities. This approach is akin to the HTC Vive's tracking system, where base stations emit structured infrared light, and sensors on the device calculate their position based on the received light signals. The advantage of this system is its high accuracy and reliability in various lighting conditions, making it suitable for detailed and precise AR applications.

While all the above tracking embodiments afford tracking the corporal entities when not held, they are not necessarily sufficient for tracking when a user holds an entity in their hand due to occlusion. However, hand tracking solutions afforded by commercially available VST-AR headsets, such as the META QUEST PRO, can be used to complement entity tracking. These headsets incorporate advanced sensors and algorithms to detect and track hand movements with high precision. If a tracked entity loses tracking after the user's hand is tracked near the same position, it can be inferred that the user picked up the corporal entity, occluding its visual features from being tracked. At this point, the system can assume the corporal entity's position is co-located with the user's tracked hand position until the user places the entity and the entity's visual features become un-occluded.

In practical application, this combined tracking approach ensures that the AR system remains robust and accurate, even in scenarios where direct visual tracking of the corporal entities is compromised. For example, during a laboratory simulation, a user might pick up a beaker (corporal entity 104) to pour a virtual liquid into another container. As the user's hand occludes the fiducial markers on the beaker, the VST-AR device seamlessly transitions to tracking the user's hand position, ensuring that the virtual representation of the beaker continues to move accurately in the augmented view. Once the user places the beaker down and the markers are visible again, the system reverts to using the fiducial markers for precise tracking.

Turning now to FIGS. 2-9, embodiments of corporal entity 104 are shown in greater detail. Corporal entity 104 can be made of any durable material that is sufficient to provide a tactile output for user interaction and is ideally made of a cost-efficient material, such as plastic or other polymer (which typically includes an associated cost that is drastically less than that of other materials, such as glass). As such, corporal entity 104 need not maintain identical properties to their conventional counterparts during use of combined AR system 100; for example, in an embodiment, corporal entity 104 is a plastic replica of thin glassware used within a laboratory environment, with VST-AR device 102 augmenting corporal entity 104 to appear similar to thin glassware via augmentation 106. For example, referring back to FIG. 1, an embodiment of corporal entity 104 is a 150 mL beaker made of plastic, with VST-AR device 102 displaying a virtual representation of the beaker including augmentation 106 of a liquid represented within the virtual representation of the beaker.

Visual augmentation involves tracking the corporal entities and then registering (i.e., spatially co-locating) a virtual representation of the entity with the corporal entity. For instance, the VST-AR component can be used to display a virtual 150 mL Pyrex beaker filled with any given solution on top of the user's video view of the corporal plastic replica of the 150 mL Pyrex beaker (see FIG. 2). This process requires accurate tracking of the corporal entity's position and orientation to ensure that the virtual augmentation aligns perfectly with the physical object, providing a seamless and realistic augmented experience. The tracking can be achieved using fiducial markers embedded in the corporal entity, infrared tracking systems, or hand tracking technologies, ensuring continuous and precise alignment between the virtual and physical elements.

Figure 2:
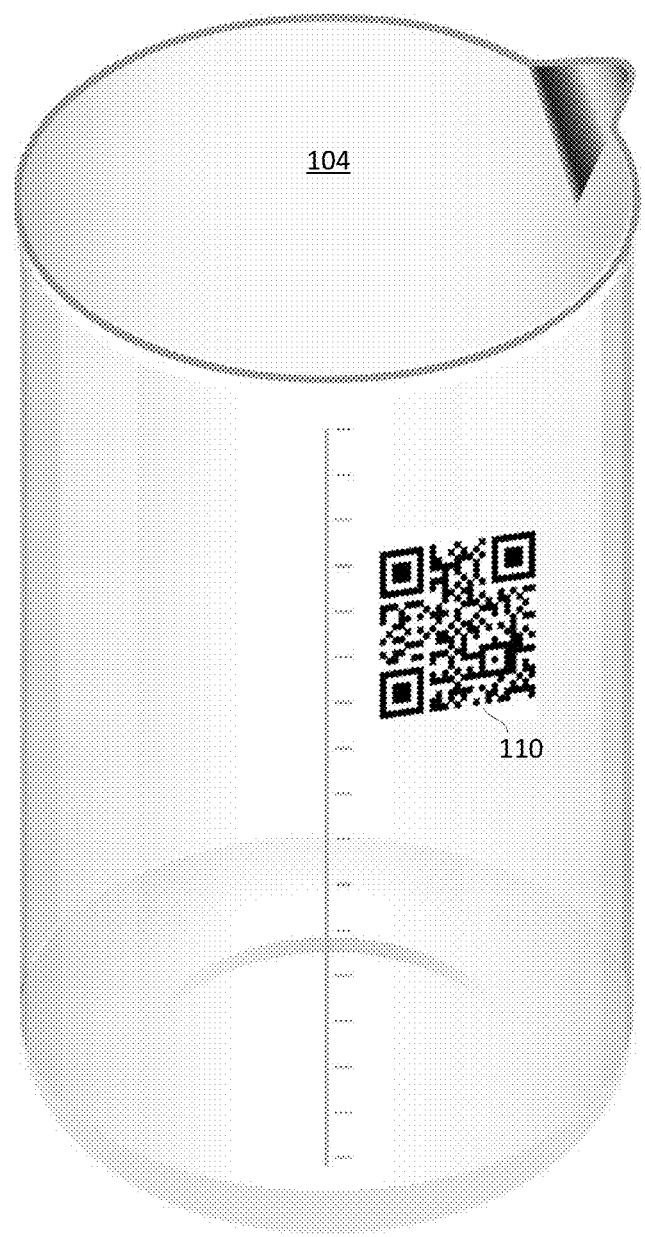
FIG. 2 is a perspective view of a corporal entity of a combined augmented reality system, the corporal entity including a visual tracking component, in accordance with an embodiment of the present invention.

Referring specifically to FIG. 2, an embodiment of corporal entity 104 includes marker 110 associated therewith; for example, in an embodiment, corporal entity 104 includes marker 110 embedded on an outer surface of corporal entity 104. Marker 110 is scannable or otherwise interactable by VST-AR device 102 to associate corporal entity 104 with VST-AR device 102. For example, in an embodiment, marker 110 includes stored information that, when scanned by VST-AR device 102, execute a program on a computing device integrated into or otherwise in communication with VST-AR device 102 to display augmentation 106 on the representation of corporal entity 104. In some embodiments, a plurality of markers 110 can be embedded onto corporal entity 104 to reduce the likelihood of a single marker 110 being occluded by a user's hand during interaction with corporal entity 104. However, in the event that marker 110 is occluded by a user's hand, an embodiment of combined AR system 100 assumes a colocation between the user's hand and corporal entity 104 to maintain a continuous display of corporal entity 104 via VST-AR device 102.

It should be appreciated that other embodiments of marker 110 include constellations of infrared lights that are embedded onto the surface of corporal entity 104, such that external infrared cameras can be used to determine the positions of the entities within the space via trilateration. Similarly, another embodiment of marker 110 includes infrared light sensors embedded into the surface of corporal entity 104 with external infrared light emitters being used to sweep across the tracking space at a known frequency to determine the positions of the entities via trilateration.

Machine scannable indicia, such as the marker 110 depicted in FIG. 2, serve a role in the spatial orientation and recognition of physical objects within augmented reality (AR) environments. These markers, including QR codes and other types of machine-readable symbols, provide a standardized method for encoding information that can be efficiently decoded by AR devices, such as VST-AR device 102. This encoded information can include the identity, model type, dimensions, and other relevant attributes of the physical object to which the marker is affixed.

When VST-AR device 102 scans marker 110, it decodes the embedded information to retrieve data pertinent to the corporal entity 104. This data can include a unique identifier, the object's geometric properties, material composition, and any other metadata necessary for accurate representation and interaction within the AR environment. By retrieving this information, the AR system can accurately render augmentations 106 over the physical representation of corporal entity 104. This ensures that the digital enhancements are contextually appropriate and spatially aligned with the physical object, enhancing the realism and functionality of the AR experience.

The use of machine scannable indicia also enables the AR system to dynamically update the rendered augmentations based on changes in the object's position or orientation. For example, if corporal entity 104 is moved or rotated, the AR system can continuously track the updated position and orientation using the scanned marker 110. This real-time tracking allows the AR system to adjust the digital augmentations accordingly, ensuring that they remain accurately overlaid on the physical object. This dynamic interaction is essential for applications requiring precise alignment, such as virtual training environments, interactive educational tools, and industrial maintenance systems.

Furthermore, embedding detailed information into the machine-scannable code can convey the type of object model and its dimensions, providing the AR system with comprehensive data about what it is augmenting. For instance, a QR code on a laboratory beaker (like the one shown in FIG. 2) can include information about its capacity, material type, and standard measurements. When the AR device scans this QR code, it can retrieve this data and use it to render appropriate digital content, such as virtual liquid levels, chemical reaction simulations, or instructional overlays. This integration of physical and digital information ensures that the AR system can provide a seamless and informative user experience.

In practice, machine scannable indicia can be designed to encode various types of information in a compact format. For example, a QR code can store alphanumeric characters that represent the object's specifications, such as its height, width, depth, and weight. Additionally, it can include links to external databases or cloud-based services that provide more detailed information or interactive content. By scanning the QR code, the AR system can access this extended information set, enabling more complex and context-aware augmentations. This capability is particularly useful in scenarios where the physical objects are part of a larger system or process, requiring the AR system to integrate data from multiple sources to provide a comprehensive augmented reality experience.

The use of multiple markers on a single object, as mentioned, can further enhance the robustness and reliability of the AR system. By placing several markers on different surfaces of corporal entity 104, the AR system can ensure continuous tracking and interaction even if one or more markers are temporarily occluded. This redundancy improves the system's ability to maintain accurate augmentations during complex user interactions, such as handling, rotating, or manipulating the object. Additionally, the presence of multiple markers can provide additional spatial references, allowing the AR system to achieve higher precision in rendering digital content.

In addition to visual markers like QR codes, other forms of machine scannable indicia can be utilized, including RFID tags, NFC chips, and infrared markers. Each type of indicia offers unique advantages in terms of range, data capacity, and environmental suitability. For example, RFID tags can be read without a direct line of sight and can store more data than a typical QR code, making them suitable for applications where the physical objects are frequently moved or accessed in challenging conditions. NFC chips, on the other hand, enable close-range communication and can trigger specific actions when brought into proximity with an AR device, such as initiating a guided tutorial or displaying detailed instructions.

Figure 3:
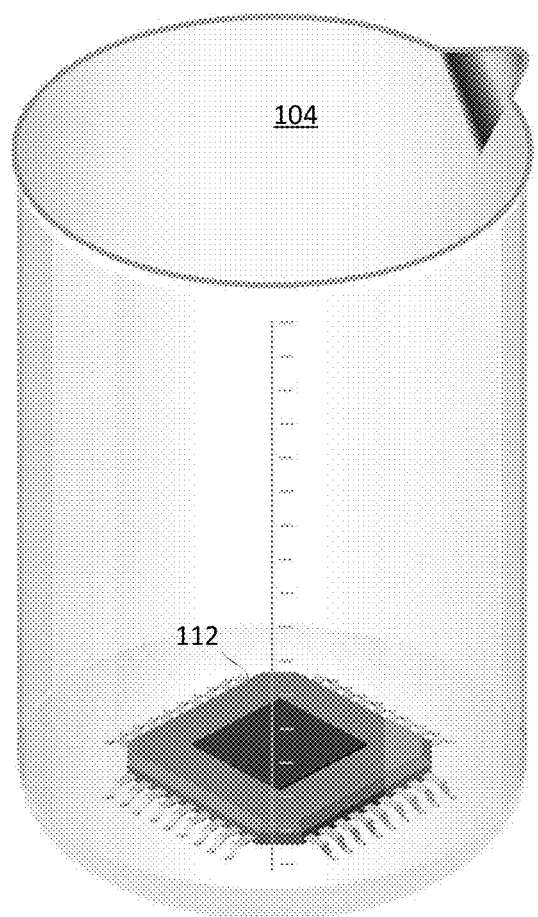
FIG. 3 is a perspective view of a corporal entity of a combined augmented reality system, the corporal entity including an inertial measurement unit for orientation tracking, in accordance with an embodiment of the present invention.

As noted above, in embodiments of combined AR system 100, corporal entity 104 can become partially or entirely occluded by a user's body part during interaction between the user and corporal entity 104, thereby preventing or otherwise diminishing tracking of corporal entity 104. Accordingly, as shown in FIG. 3 in particular, an embodiment of combined AR system 100 includes inertial measurement unit (IMU) 112 incorporated into corporal entity 104, with IMU 112 configured to sense, record, and transmit positioning information related to corporal entity 104 to a computing device associated with VST-AR device 102. In an embodiment, IMU 112 includes an accelerometer, a gyroscope, and a magnetometer to track an orientation of corporal entity 104 at high frequencies (such as 1000 Hz), thereby providing for position approximation of corporal entity 104 alone or in combination with the tracking of marker 110. In addition, embodiments of IMU 112 approximate the forces involved in collisions between the virtual representations of corporal entities 104. For example, the accelerometers in two separate corporal entities 104 detect that the forces involved in a collision between the two entities 104 would result in one or both entities 104 breaking if entities 104 were made of glass instead of plastic. Additionally, IMU 112 tracking allows for simulation of pouring or otherwise transferring materials into and out of corporal entity 104, safely handling and placing corporal entity 104 on a surface, and preventing collisions between corporal entity 104 and other surfaces.

IMUs are components in various applications, including augmented reality (AR) systems, because they provide precise and real-time data on the orientation and movement of objects. An inertial measurement unit typically comprises three main types of sensors: accelerometers, gyroscopes, and magnetometers. These sensors work in conjunction to provide a comprehensive understanding of an object's motion and orientation in three-dimensional space. By integrating an IMU into corporal entity 104, the AR system can achieve a high degree of accuracy and responsiveness, enhancing the user's interactive experience.

Accelerometers measure linear acceleration along one or more axes. In the context of the IMU 112 in corporal entity 104, accelerometers detect changes in velocity and the forces acting upon the object. This information is essential for determining the position of corporal entity 104 when it is moved, shaken, or subjected to other dynamic interactions. Gyroscopes, on the other hand, measure angular velocity, providing data on the rotational movements of corporal entity 104. By combining the readings from the accelerometers and gyroscopes, the IMU can calculate the object's orientation and detect complex motions such as tilting, spinning, and shaking.

Magnetometers are used to measure the strength and direction of the magnetic field surrounding the object. In combination with accelerometers and gyroscopes, magnetometers help to correct any drift errors that may occur in the IMU's calculations, ensuring long-term accuracy and stability in tracking the orientation of corporal entity 104. This trio of sensors enables the AR system to maintain precise spatial awareness of the corporal entity, even when visual markers are temporarily obscured or unavailable.

Several exemplary IMUs are suitable for incorporation into corporal entity 104, each offering various features that enhance their performance in AR applications. One such IMU is the BOSCH SENSORTEC BMI160. The BMI160 is a high-performance IMU that integrates a 16-bit digital triaxial accelerometer and a 16-bit digital triaxial gyroscope in a compact package. It offers low power consumption and high accuracy, making it ideal for battery-operated AR devices. The BMI160 supports a wide range of motion-based applications by providing precise orientation and motion detection capabilities.

Another exemplary IMU is the INVENSENSE MPU-9250, which combines a 3-axis gyroscope, a 3-axis accelerometer, and a 3-axis magnetometer. The MPU-9250 is known for its high performance, small size, and low power consumption. It features a Digital Motion Processor (DMP) that can perform complex motion calculations internally, reducing the computational load on the main processor. This IMU is particularly suitable for AR systems that require accurate and responsive tracking of multiple corporal entities.

ANALOG DEVICES' ADIS16488 is another high-precision IMU suitable for AR applications. The ADIS16488 integrates a triaxial accelerometer, a triaxial gyroscope, and a triaxial magnetometer, along with a pressure sensor. It offers exceptional stability and accuracy, even in challenging environments. The ADIS16488 is designed for applications that require robust performance and high reliability, making it ideal for industrial AR systems and applications that involve complex motion tracking.

The integration of an IMU into corporal entity 104 allows the AR system to perform a variety of advanced functions. For instance, the IMU can detect and simulate the forces involved in collisions between virtual representations of corporal entities 104. When two entities collide, the accelerometers measure the impact forces, and the AR system can simulate the resulting physical effects, such as breaking or bouncing. This capability enhances the realism of the AR experience and provides users with valuable feedback on their interactions.

The IMU also enables the AR system to simulate the pouring and transferring of materials into and out of corporal entity 104. By tracking the orientation and movement of the entity, the AR system can accurately depict the flow of virtual liquids, powders, or other materials. This simulation is particularly useful in educational and training environments, where users can practice handling and transferring materials without the risk of spills or accidents. The IMU's data ensures that the virtual representations are synchronized with the user's real-world actions, providing a seamless and intuitive experience.

Additionally, the IMU can assist in the safe handling and placement of corporal entity 104 on surfaces. By continuously monitoring the entity's orientation and position, the AR system can provide real-time feedback to the user, ensuring that the entity is handled correctly and placed securely. This feature is particularly beneficial in scenarios that require precise manipulation of delicate or hazardous materials, such as in laboratory or industrial settings. The IMU's data helps prevent collisions and mishandling, reducing the risk of accidents and damage.

The use of IMUs in AR systems also opens up opportunities for advanced interaction techniques. For example, the AR system can utilize gesture recognition to enhance the user experience. By analyzing the data from the IMU, the system can recognize specific gestures and movements, allowing users to interact with the virtual environment in more natural and intuitive ways. This capability can be applied to various applications, such as virtual training, gaming, and remote collaboration.

Figure 4:
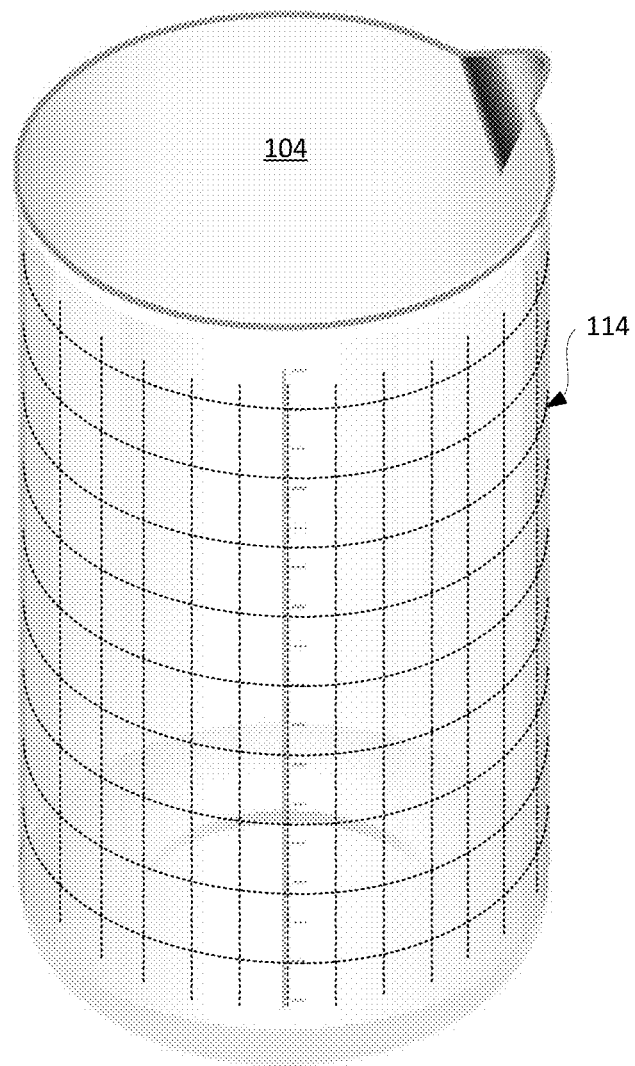
FIG. 4 is a perspective view of a corporal entity of a combined augmented reality system, the corporal entity including a tactile sensor grid, in accordance with an embodiment of the present invention.

Referring now to FIG. 4, an embodiment of corporal entity 104 includes one or more tactile sensors 114 (such as the grid of sensors 114 as shown in FIG. 4) integrated into a surface of corporal entity 104 to sense a user's touch and interaction with corporal entity 104. The one or more capacitive tactile sensors 114 indicate when the user touches a particular surface area of corporal entity 104 by detecting any changes in capacitance due to the influence of the human body's capacitance. In addition, embodiments of corporal entity 104 include tactile sensors 114 and IMU 112, such that upon corporal entity 104 receiving an external force from a user, a point of contact is detected by tactile sensors 114 and a force of contact is detected by IMU 112. As such, virtual representations of perturbations of any virtual liquid modeled and simulated within the virtual representation of corporal entity 104 as displayed via VST-AR device 102. Moreover, in some embodiments, capacitive touch information received by tactile sensors 114 are used to confirm an interaction between the user and corporal entity 104 during a period of occlusion, further enhancing the capability of tracking the occluded entity 104 through hand tracking approximations.

Touch-capacitance technology relies on the principle that the human body can hold an electrical charge, acting as a capacitor. When a human finger or hand comes into proximity with a capacitive sensor, it alters the local electric field and increases the capacitance at the point of contact. Capacitive tactile sensors 114 embedded in the surface of corporal entity 104 work by detecting these changes in capacitance. The sensor grid shown in FIG. 4 consists of multiple conductive layers separated by insulating material, which forms a grid of capacitive touchpoints.

Capacitive touch sensors are commonly constructed using materials such as indium tin oxide (ITO) or conductive polymers that are transparent and can be deposited in thin layers on a substrate. The choice of materials depends on the required flexibility, transparency, and conductivity. For instance, ITO is widely used in touchscreens for its excellent transparency and conductivity but is brittle. Conversely, conductive polymers offer more flexibility and durability, making them suitable for applications where the surface may be bent or flexed.

To deploy capacitive touch sensors on a flask, such as corporal entity 104, the sensors are typically printed or laminated onto the flask's outer surface. The process involves depositing a conductive material in a grid pattern, which can be achieved using screen printing, photolithography, or inkjet printing techniques. The sensor grid is connected to a microcontroller or touch controller chip that processes the capacitance data and determines the location of the touch points.

When a user touches the flask, the capacitive sensors detect the change in capacitance and send this data to the VST-AR device 102. The AR system uses this information to render virtual perturbations of any simulated liquid within the flask. For instance, if the user tilts the flask, the system can simulate the liquid's movement accordingly. If the user touches a specific part of the flask, the system can display corresponding feedback, such as changes in color or temperature indicators.

Moreover, capacitive touch sensors can be used to provide feedback if someone touches a simulated hot portion of the flask. This can be achieved by integrating additional components, such as haptic feedback motors or thermal modules, into the flask. For example, when the capacitive sensor detects a touch on a designated hot area, the system can activate a thermal module to slightly warm the surface or a haptic motor to vibrate, simulating the sensation of heat. This enhances the realism of the simulation and provides a more immersive user experience.

Several manufacturers produce capacitive touch sensor materials and controllers. For instance, INFINEON TECHNOLOGIES offers a range of capacitive touch sensor solutions under the CAPSENSE brand. These solutions include touch sensor controllers and software that can be used to design and implement touch interfaces. SYNAPTICS also provides touch sensor technology widely used in consumer electronics, including touchpads and touchscreens.

Figure 5:
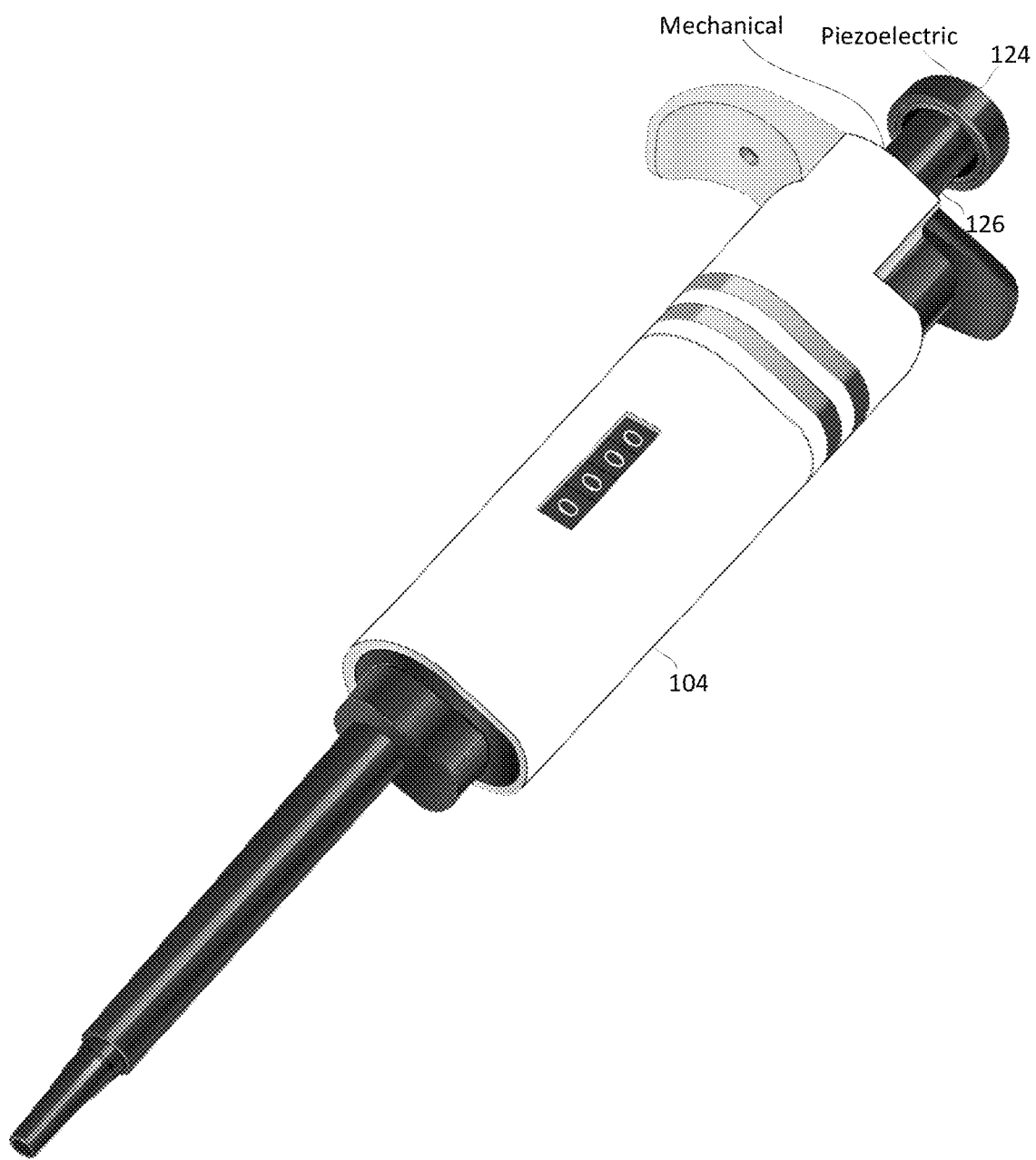
FIG. 5 is a perspective view of a corporal entity of a combined augmented reality system, the corporal entity including a piezoelectric pressure sensor and a mechanical pressure sensor, in accordance with an embodiment of the present invention.

Turning to FIG. 5, the embodiment of corporal entity 104 is a physical micro-pipette that incorporates touch-capacitance sensors, piezoelectric sensors 124, and mechanical pressure sensors 126. The micro-pipette is designed to detect advanced user interactions, such as the application of pressure and the precise positioning of the pipette tip. Touch-capacitance sensors integrated into the micro-pipette can detect when and where the user touches the device. For example, capacitive sensors embedded along the handle of the micro-pipette can determine the user's grip position and pressure. This information can be used to provide real-time feedback on the correct handling and usage of the pipette. If the user holds the pipette incorrectly or applies excessive force, the system can provide visual or haptic feedback to guide proper technique.

Piezoelectric sensors 124 in the micro-pipette detect pressure changes and mechanical stress. When the user depresses the plunger to draw or dispense liquid, the piezoelectric sensors measure the force applied. This data is critical for ensuring accurate and consistent pipetting, as variations in pressure can lead to discrepancies in the volume of liquid dispensed. By monitoring the pressure applied, the AR system can simulate the liquid flow and provide feedback to the user to adjust their technique if necessary.

Mechanical pressure sensors 126 complement the piezoelectric sensors by providing precise measurements of the force exerted on specific parts of the micro-pipette. These sensors can detect subtle changes in pressure and provide additional data to refine the simulation. For instance, mechanical sensors can measure the force applied to the pipette tip, ensuring that the user does not exert excessive pressure that could damage delicate samples or the pipette itself.

The combination of touch-capacitance, piezoelectric, and mechanical pressure sensors enables the AR system to accurately track the orientation, location, and engagement of the micro-pipette. This comprehensive tracking allows the system to provide detailed simulations of pipetting tasks, such as transferring small quantities of liquid from one vial to another. The sensors ensure that the virtual representation of the liquid movement is synchronized with the user's actions, providing an intuitive and realistic experience.

In addition to detecting user interactions, these sensors can enhance safety and training. For example, the AR system can use the sensor data to simulate potential errors and guide the user through corrective actions. If the user applies too much pressure or holds the pipette incorrectly, the system can provide immediate feedback and instructions to prevent damage or inaccuracies. This capability is particularly valuable in training environments, where users can practice their techniques in a safe and controlled setting.

Manufacturers such as TEXAS INSTRUMENTS, STMICROELECTRONICS, and HONEYWELL produce components suitable for integrating touch-capacitance, piezoelectric, and mechanical pressure sensors into devices like the micro-pipette. TEXAS INSTRUMENTS offers a range of capacitive touch solutions, including touch controllers and sensor ICs. STMICROELECTRONICS provides piezoelectric sensor components that can be used for precise pressure measurements. HONEYWELL manufactures mechanical pressure sensors known for their accuracy and reliability in various applications.

Figure 6:
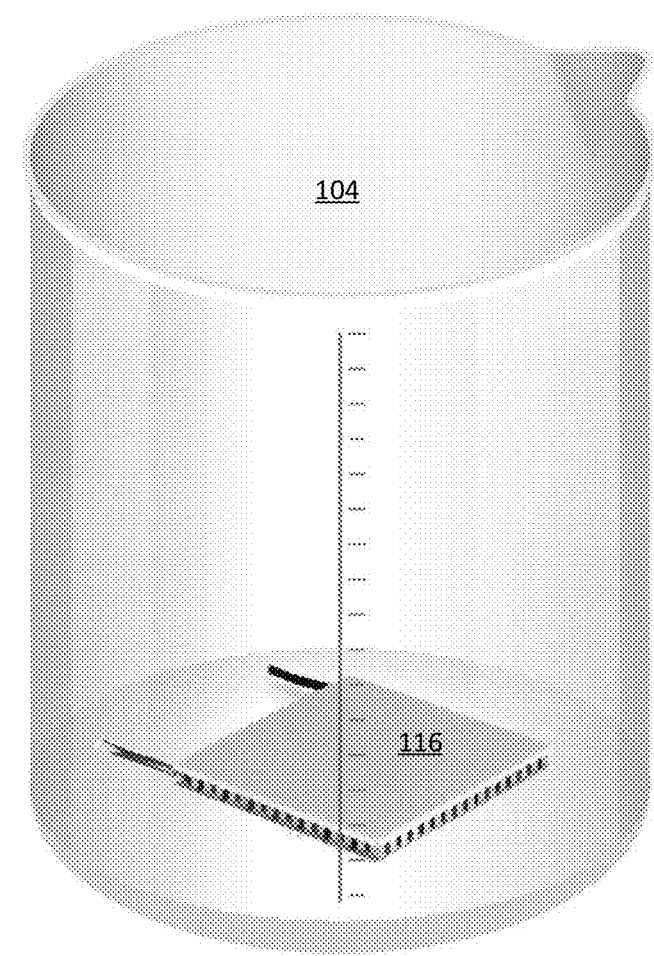
FIG. 6 is a perspective view of a corporal entity of a combined augmented reality system, the corporal entity including a thermodynamic diode to output different temperatures, in accordance with an embodiment of the present invention.

Embodiments of corporal entity 104 include one or more self-contained stimuli-producing components, with detectable stimuli outputs including one or more of temperature, olfactory, acidity, fluid dynamics, weight, and similar stimuli outputs. For example, as shown in FIG. 6, an embodiment of corporal entity 104 includes thermal diode 116 integrated therein, such that thermal diode 116 is in direct contact with a surface of corporal entity 104. Thermal diode 116 includes a directional heat flow channel therein, such that thermal diode 116 can emit different temperatures based on the direction and magnitude of the heat flow. Since thermal diode 116 is in contact with a surface of corporal entity 104, the temperature changes based on heat flow within thermal diode 116 in turn cause temperature changes in the surface of corporal entity 104, thereby providing tactile representations of exothermic (represented by heating) or endothermic (represented by cooling) chemical reactions. In an embodiment, corporal entity 104 is made of metal or a similar conductive material to provide an enhanced temperature change.

In greater detail, the thermal diode 116 operates based on the principle of thermoelectric effects, specifically the Peltier effect. This effect allows for the transfer of heat from one side of the diode to the other when an electric current passes through it. The thermal diode 116, therefore, can create a temperature gradient, making one side of the diode hot and the other side cold, depending on the direction of the current. This bidirectional capability enables the simulation of both heating and cooling effects on the surface of corporal entity 104.

The materials used in the construction of thermal diodes typically include semiconductor materials such as bismuth telluride ($Bi_2Te_3$) and antimony telluride ($Sb_2Te_3$), which have high thermoelectric efficiency. These materials are sandwiched between metal conductors, forming a series of thermocouples that facilitate the transfer of heat. The use of such materials ensures that the thermal diode 116 can achieve significant temperature differences, providing a realistic tactile sensation of temperature changes to the user.

In the context of corporal entity 104, the thermal diode 116 is embedded within the structure of the flask or other physical entity, ensuring direct contact with the outer surface. When the AR system triggers a thermal response, the thermal diode 116 activates and adjusts the surface temperature accordingly. For example, during a simulated exothermic reaction, the thermal diode 116 heats up the surface to mimic the effect of a chemical reaction releasing heat. Conversely, for an endothermic reaction, the thermal diode 116 cools the surface, simulating the absorption of heat.

An embodiment of corporal entity 104 includes an electrical conductor, such as an electrical diode, an electrical wire, or an electrode, in electrical communication with a surface of corporal entity 104 to conduct an amount of electricity through a surface of corporal entity 104. This feature allows the AR system to simulate contamination sensations. For instance, in a controlled environment, a safe simulation of contamination induced by contacting a strong acid or base is achieved by conducting small and safe amounts of electricity along the surfaces of the entity 104 as the user grasps it. This mild electrical conduction provides a tactile response that simulates the sensation of handling contaminated or reactive materials without any real danger.

The integration of these stimuli-producing components enhances the realism and educational value of AR simulations. By providing tactile feedback, users can experience the physical sensations associated with chemical reactions, such as heat and electrical conductivity, which are crucial for learning and training in scientific disciplines.

Using surface sensing technologies as described above on corporal entity 104 provides safe but effective simulations of sensations related to chemical reactions. For example, a reflux reaction involves heating a lower vessel and continuously boiling contents, with a reflux condenser used to condense the resulting gaseous solvent back into a liquid. The surface sensing technology on corporal entity 104 safely simulates the interaction between the user and the heated portion of corporal entity 104, providing tactile feedback to indicate that the user has touched a hot surface (which can typically reach up to 200° C. in a non-simulated reaction).

The incorporation of thermal diodes and electrical conductors allows for detailed and realistic simulations of laboratory scenarios. For instance, in a reflux reaction, the AR system can simulate the gradual heating of the flask's surface as the reaction proceeds, providing real-time feedback to the user. If the user touches the flask during the simulated reaction, the thermal diode 116 can create a sensation of heat, alerting the user to the high temperature, just as in a real laboratory setting. This tactile feedback is crucial for teaching proper safety protocols and handling techniques.

Furthermore, the ability to simulate contamination through electrical conduction adds another layer of realism to the AR system. In real laboratory environments, accidental contamination with acids, bases, or other hazardous substances poses significant risks. By simulating these sensations safely, users can learn to recognize and respond to contamination events, reinforcing the importance of safety measures and proper handling procedures.

Manufacturers such as LAIRD THERMAL SYSTEMS and TE CONNECTIVITY produce advanced thermal management components, including thermoelectric modules suitable for these applications. LAIRD'S thermoelectric modules, for example, offer precise temperature control and efficient heat transfer, making them ideal for integration into AR systems like corporal entity 104. TE CONNECTIVITY also provides a range of thermoelectric coolers and heaters that can be used to create realistic temperature variations on the surface of physical entities in AR environments.

Figure 7:
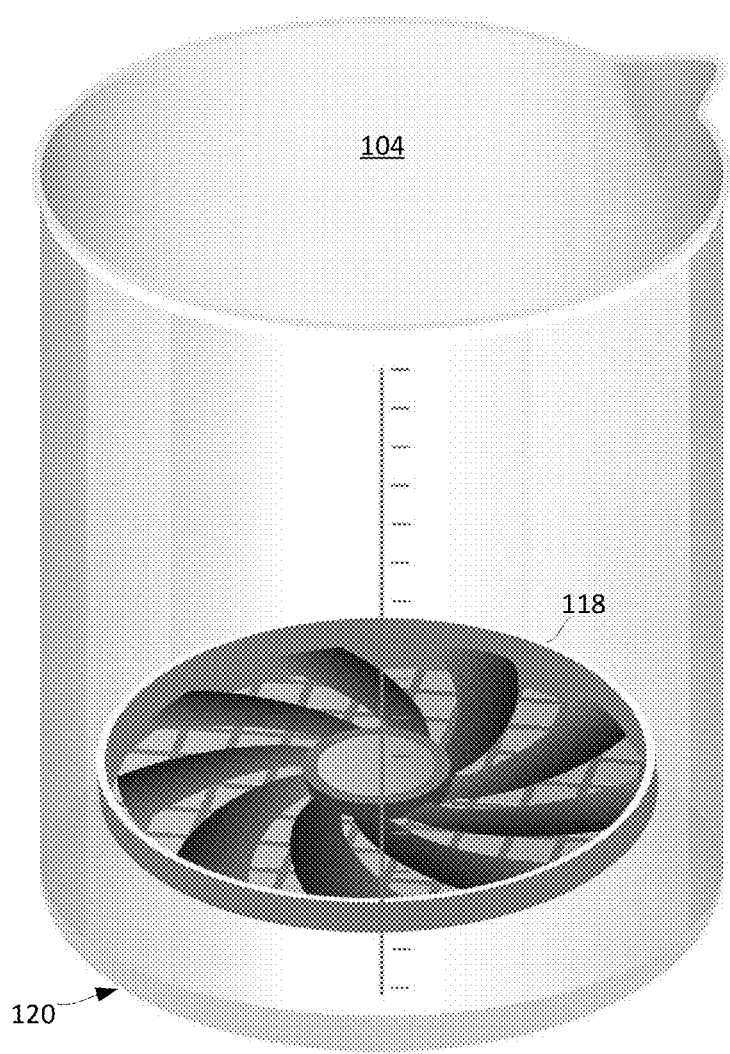
FIG. 7 is a perspective view of a corporal entity of a combined augmented reality system, the corporal entity including an olfactory output fan, in accordance with an embodiment of the present invention.

Similarly, referring now to FIG. 7, embodiments of corporal entity 104 include components to emit an olfactory stimulus from corporal entity 104 such that a user can experience a scent-based stimulus. For example, an embodiment of corporal entity 104 includes an amount of scented substance 120 disposed therein, such as an essential oil, a wax, or another olfactory-detectable scented material. In addition, an embodiment of corporal entity 104 includes fan 118 disposed therein proximate to scented substance 120, such that fan 118 evaporates and/or disperses a gas phase of scented substance 120 out of corporal entity 104 for interaction with a user. In other embodiments, a passive vented chamber is disposed within corporal entity 104 including an amount of scented substance 120 therein to passively vent a gas phase of scented substance 120 out of corporal entity 104 for interaction with a user. In another embodiment, an active heating element is disposed proximate to an amount of scented substance 120 to heat substance 120 and accelerate a phase change of substance 120 to vent a gas phase of scented substance 120 out of corporal entity 104 for interaction with a user.

Olfactory stimuli are crucial for creating immersive and realistic augmented reality (AR) experiences, particularly in applications like virtual training, gaming, and educational simulations. By integrating olfactory components into corporal entity 104, users can experience a full spectrum of sensory inputs, which enhances the realism and depth of the interaction. The olfactory components function by dispersing scents that can simulate various environmental conditions or reactions, such as the smell of chemicals in a lab, flowers in a garden, or food in a cooking simulation.

The olfactory stimulus system in corporal entity 104 can be designed in several ways. One common approach is to use scented substances, such as essential oils, waxes, or other materials that release detectable scents when heated or exposed to air. These scented substances are strategically placed within corporal entity 104 to ensure efficient dispersion of the scent.

A fan 118 is a key component in the olfactory system, responsible for dispersing the scent. The fan 118, located near the scented substance 120, operates by creating airflow that carries the scent molecules out of corporal entity 104. The fan can be activated when the AR system detects that the user is in proximity or interacting with corporal entity 104. This ensures that the scent is released at the appropriate time, enhancing the immersive experience. The fan's speed and duration can be controlled to regulate the intensity and persistence of the scent, providing dynamic and responsive olfactory feedback.

In addition to the fan, passive venting systems can be used to emit scents. A passive vented chamber within corporal entity 104 contains the scented substance 120, allowing the scent to diffuse naturally over time. This method does not require active components like fans or heating elements, making it simpler and more energy-efficient. However, it may provide less control over the timing and intensity of the scent release compared to active systems.

Active heating elements are another critical component in the olfactory system. By applying heat to the scented substance 120, the active heating element accelerates the phase change from solid or liquid to gas, thereby increasing the release rate of scent molecules. This method is particularly effective for substances that require higher temperatures to volatilize. The heating element can be precisely controlled to adjust the temperature and, consequently, the intensity of the scent. This provides a versatile and adaptable olfactory stimulus system that can simulate a wide range of environmental conditions and scenarios.

Figure 8:
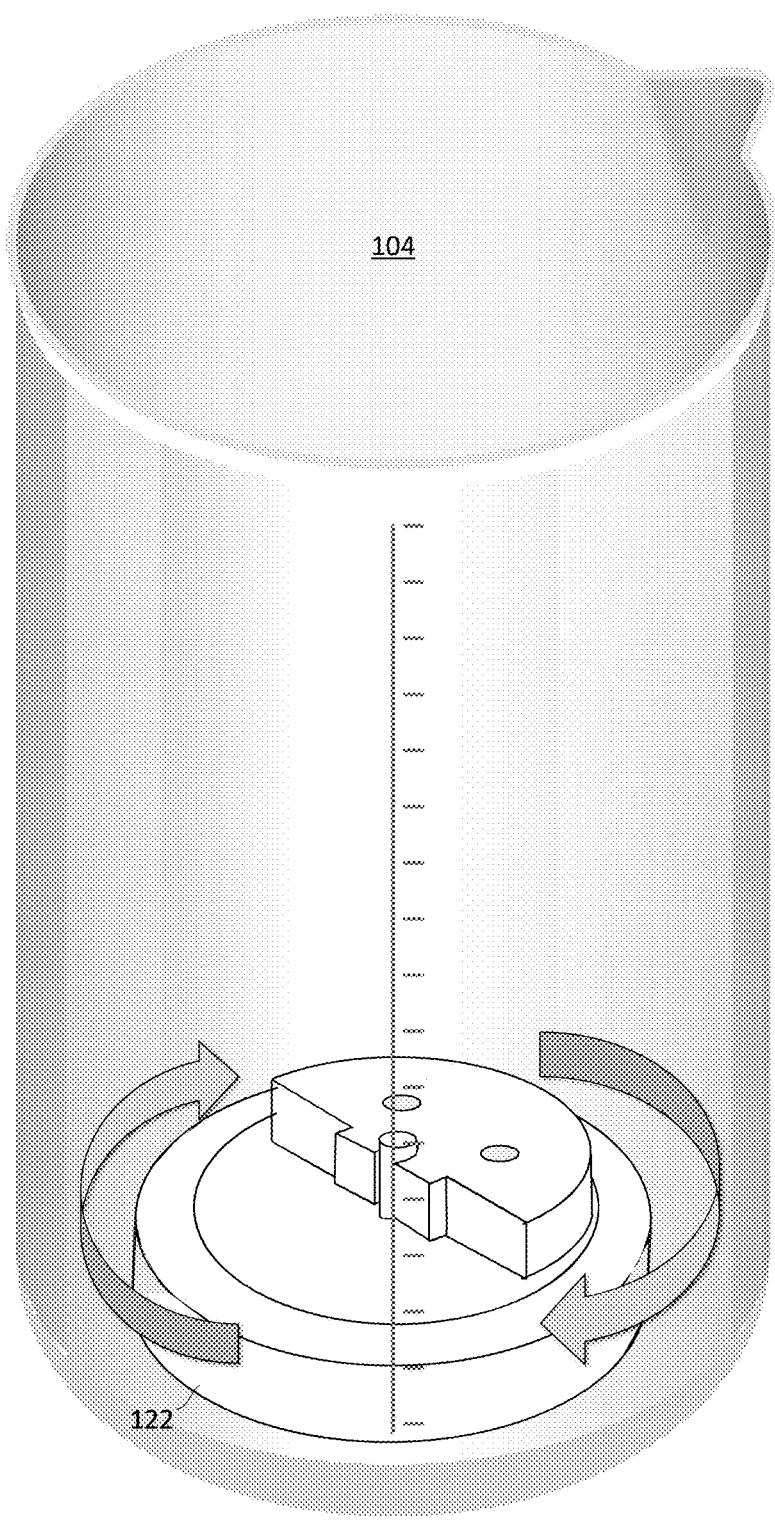
FIG. 8 is a perspective view of a corporal entity of a combined augmented reality system, the corporal entity including a rotating motor to simulate centrifugal forces, in accordance with an embodiment of the present invention.

Turning to FIG. 8, an embodiment of corporal entity 104 includes an eccentric rotating mass (ERM) motor 122 disposed therein. The ERM motor 122 is configured to rotate about a central axis, such that a user grasping corporal entity 104 detects a centrifugal force emitted from corporal entity 104. This setup provides a tactile simulation of fluid stirring within a beaker via the ERM motor 122 disposed within corporal entity 104.

ERM motors are commonly used in various applications to generate vibrations. The basic principle involves an unbalanced mass attached to the motor shaft, which creates a centrifugal force as the motor rotates. This force induces vibrations in the surrounding structure, which can be finely controlled by adjusting the speed of the motor and the mass's position. In the context of corporal entity 104, the ERM motor 122 simulates the tactile sensation of stirring a liquid within a beaker, enhancing the realism of the AR experience.

The materials used for constructing ERM motors typically include durable metals for the rotating mass and the motor shaft, ensuring longevity and consistent performance. The housing of the motor is often made from sturdy plastics or metal alloys to protect the internal components from damage. High-quality bearings are also used to ensure smooth rotation and reduce wear over time.

Manufacturers like PRECISION MICRODRIVES and TEXAS INSTRUMENTS produce ERM motors that are suitable for integration into AR systems. PRECISION MICRODRIVES offers a range of vibration motors, including compact ERM motors designed for handheld devices. TEXAS INSTRUMENTS provides motor driver ICs that can control the operation of ERM motors, allowing for precise adjustments to the vibration intensity and pattern.

Incorporating an ERM motor into corporal entity 104 involves careful placement and calibration to ensure that the vibrations accurately simulate the desired tactile sensations. The motor must be securely mounted within the entity, and its operation must be synchronized with the visual and auditory components of the AR system. This synchronization ensures that users experience a cohesive and immersive interaction when performing tasks like stirring or mixing.

Figure 9:
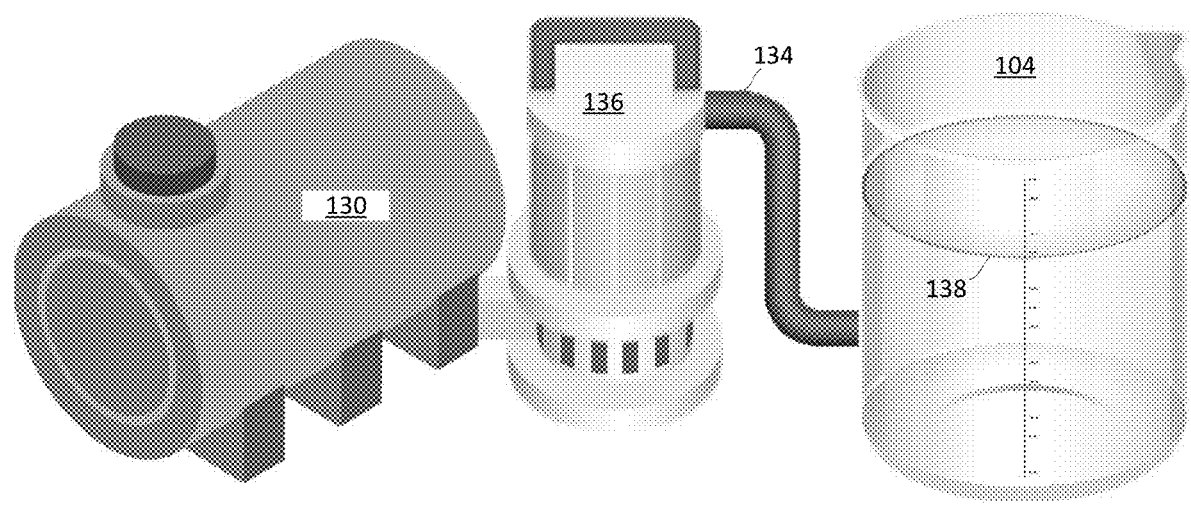
FIG. 9 is a perspective view of a corporal entity of a combined augmented reality system, the corporal entity in fluidic communication with a reservoir or fluid to alter a weight of the corporal entity, in accordance with an embodiment of the present invention.

As shown in FIG. 9, an embodiment of corporal entity 104 includes a fluid flow system configured to simulate weight changes within corporal entity 104 during user interaction. Specifically, this system includes a reservoir 130 containing an amount of fluid 132. The reservoir 130 is fluidically coupled to corporal entity 104 via conduit 134, and a bidirectional pump 136 is fluidically coupled to conduit 134. Fluid 132 can flow into corporal entity 104 via conduit 134 to increase the weight of corporal entity 104, and fluid 132 can be removed from corporal entity 104 via conduit 134 to decrease its weight.

This fluid flow system allows the AR system to dynamically alter the physical properties of corporal entity 104, providing users with realistic feedback on weight changes. For example, in a laboratory simulation, the system can simulate the addition or removal of liquids, giving users a tactile sense of the changing weight as they pour substances in or out of the beaker.

The reservoir 130 and conduit 134 are typically constructed from materials that are resistant to corrosion and capable of withstanding repeated use. Common materials include stainless steel, various polymers like polyethylene or PVC, and specialized chemical-resistant coatings. The bidirectional pump 136 must be capable of precisely controlling the flow of fluid, allowing for smooth and accurate weight adjustments. Pumps from manufacturers like KNF NEUBERGER and COLE-PARMER are suitable for this application.

In addition to physical changes, the fluid flow system can be integrated with the visual and auditory components of the AR system. As fluid is added or removed, the AR display can visually represent the changing liquid levels, while synchronized sound effects can enhance the realism of the interaction. For instance, users can hear the sound of liquid pouring and splashing, providing a multi-sensory experience that reinforces the physical feedback from the changing weight.

In addition to visual representation and tactile feedback, embodiments of the combined AR system 100 include auditory augmentation provided to a user, such as by emitting sounds from headphones, earphones, or speakers associated with VST-AR device 102. For example, an embodiment of system 100 includes an audio output of glass-based sound effects when corporal entity 104 collides with another object, such as another corporal entity 104 or another tracked surface. Other examples of auditory augmentations include sound effects for other types of rigid-body collisions, soft-body or fluid dynamics (such as the sound of liquid pouring into a beaker), and chemical reactions (such as exothermic explosions). Combined with the tracking of corporal entity 104 via marker 110 described in detail above, embodiments of the auditory augmentations are spatially represented to deliver sounds to a user based on the position of corporal entity 104 in a represented three-dimensional space.

Auditory augmentation significantly enhances the immersion and realism of the AR experience. By providing spatially accurate sound effects, the AR system can create a convincing audio landscape that corresponds with the visual and tactile stimuli. For example, when corporal entity 104 is moved or shaken, the system can emit sounds that match the expected acoustic properties of the interaction. This includes the clinking of glass, the sloshing of liquid, and the subtle hum of the ERM motor in operation.

To achieve high-quality auditory augmentation, the AR system uses advanced audio processing techniques, including 3D audio rendering and real-time sound synthesis. These techniques ensure that the sound effects are not only realistic but also spatially accurate, providing users with a sense of direction and distance. This spatial audio capability is particularly important in scenarios where multiple corporal entities or other objects are interacting, as it helps users to perceive and respond to the virtual environment more naturally.

Manufacturers like BOSE, SENNHEISER, and SONY produce high-fidelity audio equipment that can be integrated into AR systems. These companies offer headphones and earphones with advanced features such as active noise cancellation, spatial audio support, and high-resolution sound quality. By incorporating such equipment, the AR system can deliver an auditory experience that complements the visual and tactile components.

The integration of auditory, visual, and tactile feedback creates a comprehensive multi-sensory experience that enhances user engagement and learning. For instance, in an educational setting, students can perform virtual experiments that mimic real-life procedures, receiving immediate feedback through sight, touch, and sound. This holistic approach not only improves understanding and retention but also makes the learning process more enjoyable and interactive.

EXAMPLES

Within a chemistry classroom setting, temperature indicates a variety of conditions with a reaction, including 1) a phase change of the system (physical change) or 2) the thermodynamics of a reaction (e.g., exothermic or endothermic). Temperature conveying capabilities of corporal entity 104 are usable to convey chemistry concepts, such as phase change transitions between solids, liquids, and gases. In these phase changes, the molecules of the system need to transition from a solid state to a more disordered system (e.g., water boiling to form steam) or a less disordered system (e.g., water solidifying into ice). During a phase change, the temperature of a substance neither increases nor decreases (e.g., as you heat ice into water, the temperature of the system does not increase above 0° C.). However, once all the ice has melted into water, the temperature of the system begins to increase. Although this can be represented with ice cubes, there are more systematic and dependable systems are often used to teach phase changes, such as waxes that require more energy to change their state.

In addition, colligative properties are represented via teaching systems. A pure substance includes a set freezing and melting point. When impurities are added to the substance, the freezing point occurs at a lower temperature and the boiling point occurs at a high temperature. These principles are often taught using glucose levels in cells to reduce the cells from lysing and altering the freezing point of naphthalene using different salt species. However, corporal entity 104 conveys the relative temperature changes between a pure substance and a pure substance when impurities are added.

Moreover, the ideal gas laws use five variables, with one of those variables being heat. By altering the temperature of a gas system, the pressure and/or volume of the gas can be changed, similar to the combustion reaction in a car engine. As the fuel is ignited, the gas expands to fill the space driving the piston. Using corporal entity 104 with temperature conveying capabilities, a relationship is conveyed between the change in temperature and the resulting effects in a controlled safe environment without additional risks.

In addition, chemical reactions often create both positive, negative, and harmful/lethal scents. For example, esters can produce scents that can differ based on chirality. For example, the ester for the spearmint smell is almost identical to the structure for caraway smell. As such, utilizing corporal entity 104 including olfactory properties, combined AR system 100 conveys a simulated scenario in which different chiral products are produced based on user decisions. For example, a controlled simulation of potentially harmful and dangerous scents via corporal entity 104 includes a deployable smelling salt in place of the harmful chemicals while providing a teaching opportunity via combined AR system 100.

Similarly, chemical exposure can result in many hazardous side effects, such as chemical burns, eye damage, corrosion, and similar impacts. The inclusion of one or more conductivity stimulators within corporal entity 104 has the specific design of mimicking contaminated glassware as a result of a spill and drips on the side of the glass. As such, contamination indicators can be simulated within a controlled environment without any real risk to the user. Moreover, corporal entity 104 can be used as a feedback system for any type of contamination, such as bacterial, radiological, chemical, environmental, and similar contaminations, to train use behavior regarding the potential risks of contamination without the real risk of permanent damage to the user.

Fluid dynamics are an important component of chemistry experimentation, with examples including stirring, mixing, swirling, and agitating as the reactants are mixed. In many of these cases, mechanical stirrers (such as a magnetic stirrer bar and stirrer plate) are used to control the level of stirring required within corporal entity 104. In addition, human stirring practices can be simulated mixing reagents together, such as while performing a titration experiment in which a small amount of liquid is drip fed into a flask containing an unknown sample. Without mixing correctly (swirling), the rate of liquid diffusion and reactions with the unknown sample leads to an over calculation for the amount of added liquid. The swirling motion ensures that the liquid is homogenized giving better readings. Adding a gyroscope feature to corporal entity 104 helps simulate the addition of liquid and train users to use best practices in its application (such as by improving muscle memory).

One of the challenges with using AR systems is reflecting the change in liquid added to the glassware and removed from the glassware, since such additions and removals change the weight/mass of the object in a real-life setting. As such, embodiments of corporal entity 104 ensure that the user experiences a simulated exchange of mass to mimic the differences between when a real-life glassware does and does not contain, for example, an amount of liquid, such as adding the liquid to a beaker, or pouring liquid from a measuring cylinder.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premises or remote such as in the "cloud" through vendors operating under the brands, MICROSOFT AZURE, AMAZON WEB SERVICES, RACKSPACE, and KAMATERA.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claims Terms

Augmented reality (AR) means a technology that overlays digital information, such as images, sounds, or other data, onto the real world, enhancing a user's perception of their environment. In the context of this disclosure, AR leverages devices equipped with cameras and displays to merge real-world views with computer-generated augmentations. The primary function of AR is to provide interactive experiences where physical and digital objects coexist and interact in real-time. For example, AR can simulate chemical reactions within a beaker, providing visual and tactile feedback to the user through various sensors and display technologies. AR systems often include tracking mechanisms to ensure that virtual objects remain aligned with the real-world environment, enhancing the realism and immersion of the experience. This technology has applications across various fields, including education, training, entertainment, and industrial design, offering a versatile platform for enhancing user interaction and learning.

Capacitive tactile sensors mean devices that detect touch by measuring changes in capacitance. In augmented reality (AR) systems, these sensors are used on corporal entities to track user interactions. When a user touches the surface of a capacitive tactile sensor, the sensor detects the change in capacitance caused by the conductive properties of the human body. This data is then relayed to the AR system, providing real-time feedback about the touch location and pressure. This information can be used to trigger specific virtual actions, such as displaying additional information, initiating a simulation, or adjusting the virtual representation of the object. Capacitive tactile sensors enhance the tactile experience of the virtual environment by allowing users to interact with digital content through natural touch gestures, thereby increasing the realism and immersion of the AR experience.

Chemical reactions mean processes that involve the transformation of substances through the breaking and forming of chemical bonds. In AR systems, chemical reactions can be simulated by augmenting physical objects with visual, tactile, and olfactory feedback to mimic real-world reactions. For instance, a corporal entity can simulate the heat and visual change of a chemical reaction, providing a safe and interactive way for users to learn about and observe these processes in a controlled virtual environment. The simulation of chemical reactions in AR can include detailed animations of molecular interactions, color changes, gas evolution, and temperature variations. This enables users to study and understand complex chemical phenomena without the risks associated with handling actual chemicals, making AR a valuable tool for educational and training purposes in chemistry and related fields.

Corporal entity means a physical object designed to interact with augmented reality (AR) systems to provide tactile, sensory, and stimuli-producing feedback. These entities, such as beakers, pipettes, or other laboratory equipment, are augmented via AR to simulate real-world interactions and conditions. Corporal entities are equipped with various sensors and markers to enable accurate tracking and interaction within the AR environment. They serve as tangible interfaces through which users can experience augmented feedback, enhancing the realism and educational value of simulations. By integrating sensors such as accelerometers, gyroscopes, and capacitive touch sensors, corporal entities can detect and respond to user actions, providing a seamless and interactive experience that closely mimics real-world operations.

Eccentric rotating mass (ERM) motor means a device that creates vibrations through the rotation of an unbalanced mass. In AR, ERM motors are used to simulate tactile feedback, such as the sensation of stirring a liquid in a beaker, enhancing the user's interaction with the virtual environment. The ERM motor works by spinning an off-center weight, generating centrifugal force that causes the motor to vibrate. These vibrations can be finely controlled to produce varying intensities and patterns, simulating different tactile sensations. ERM motors are often integrated into corporal entities to provide haptic feedback that complements visual and auditory augmentations, making interactions more realistic and immersive.

Field of views (FOV) mean the extent of the observable environment that is visible at any given moment through a display or lens. In AR systems, the FOV is crucial as it determines the area in which digital augmentations can be overlaid on the real world. A wider FOV allows for a more immersive experience by encompassing a larger portion of the user's surroundings. Modern AR devices strive to maximize the FOV to ensure that virtual objects seamlessly blend with the physical environment, providing a more realistic and engaging user experience. The FOV is measured in degrees and can vary depending on the design and specifications of the AR device. Devices with a larger FOV provide a more natural and comprehensive view, enhancing the user's ability to interact with augmented content.

Fiducial markers mean reference points used to align and register physical objects with their digital representations in AR systems. These markers enable precise tracking and positioning of corporal entities, ensuring accurate and consistent augmentations. Commonly used fiducial markers include QR codes and AR-specific symbols. By embedding fiducial markers on corporal entities, AR systems can quickly identify and track these objects, providing stable and reliable augmentation. The markers can be designed to be visually distinct and easily recognizable by the AR device's cameras and software, facilitating seamless integration and interaction within the augmented environment.

Glassware means laboratory equipment made of glass, typically used for scientific experiments involving chemicals and heat. In AR applications, glassware such as beakers and test tubes can be replicated using durable materials like plastic while augmented to appear as traditional glassware. These augmented glassware items provide a realistic experience by simulating the visual and tactile properties of glass, including transparency, weight, and reactions to heat. The use of augmented glassware in AR allows for safe and cost-effective simulations of laboratory procedures, enabling users to practice and learn without the risks associated with handling actual glass.

Gyroscope means a device that measures the angular velocity of an object. In AR systems, gyroscopes help track the rotational movements of corporal entities. By providing data on the object's orientation changes, gyroscopes enable the AR system to render precise and responsive digital content that matches the physical movement, such as rotating a beaker or stirring a solution. Gyroscopes work by detecting changes in the orientation of the device relative to the Earth's gravity, providing accurate measurements that are essential for maintaining the alignment of virtual and physical elements in AR applications.

Inertial measurement unit (IMU) means a sensor device that measures the specific force, angular rate, and magnetic field surrounding an object. IMUs typically include accelerometers, gyroscopes, and magnetometers. In the context of AR, IMUs track the motion and orientation of corporal entities, providing precise data for rendering accurate digital augmentations. For example, an IMU can detect if a beaker is being tilted or shaken, allowing the AR system to adjust the visual representation of liquid within the beaker accordingly. This tracking capability ensures that virtual interactions closely mimic real-world behaviors, enhancing the immersive experience for the user.

Infrared lights mean light sources that emit infrared radiation. In AR systems, infrared lights can be used for tracking corporal entities by embedding them into objects and using external cameras to detect their position. This method allows for accurate spatial awareness and interaction, even in low-light conditions. Infrared lights are invisible to the human eye but can be detected by specialized sensors, making them ideal for unobtrusive tracking in AR applications. By using infrared lights, AR systems can maintain precise tracking of corporal entities, ensuring that virtual augmentations remain aligned with physical objects.

Infrared markers mean tags that use infrared light for tracking and identification. These markers are used in AR systems to provide accurate positioning and interaction data for corporal entities, enhancing the realism and precision of digital augmentations. Infrared markers emit signals that can be detected by infrared sensors, allowing the AR system to determine the location and orientation of the marked objects. This tracking method is particularly useful in environments where visible markers might be occluded or where low-light conditions prevail, ensuring consistent and reliable tracking for AR applications.

Machine scannable indicia mean codes or symbols that can be read by machines to obtain information about an object. Examples include QR codes, RFID tags, and barcodes. In AR, these indicia provide data on corporal entities, enabling the system to render appropriate augmentations and track the object's properties and movements. Machine scannable indicia are essential for identifying and managing physical objects within the AR environment, ensuring that each entity can be accurately tracked and augmented. These codes can store various types of information, such as the object's identity, specifications, and interaction history, facilitating seamless integration and interaction in the augmented space.

Magnetometer means a sensor that measures the strength and direction of the magnetic field around an object. In AR applications, magnetometers are used to correct drift errors in the data from accelerometers and gyroscopes, ensuring accurate long-term tracking of a corporal entity's orientation. This sensor helps maintain precise spatial awareness, which is critical for consistent and realistic augmentations. By providing data on the Earth's magnetic field, magnetometers enable AR systems to determine the absolute orientation of objects, ensuring that virtual content remains accurately aligned with the physical world.

Mechanical pressure sensors mean devices that measure the force exerted on an object. Mechanical pressure sensors in AR systems provide precise data on the force applied to corporal entities, enhancing the realism of simulations. For example, they can detect the pressure exerted when a user grips a beaker, allowing the AR system to render corresponding digital feedback. These sensors use various mechanisms, such as strain gauges or piezoelectric elements, to convert mechanical force into electrical signals, providing accurate measurements that are essential for realistic and responsive AR interactions.

Micro-pipette means a laboratory tool used to measure and transfer small volumes of liquid. In AR, micro-pipettes can be augmented with sensors to simulate precise liquid handling tasks, providing visual and tactile feedback to ensure accurate and consistent results. These augmented micro-pipettes allow users to practice delicate procedures in a safe and controlled virtual environment, enhancing their skills and confidence. By integrating sensors such as capacitive touch sensors and piezoelectric pressure sensors, AR systems can provide detailed feedback on the user's technique, ensuring that virtual simulations closely mimic real-world operations.

Multifunctional corporal entities mean physical objects equipped with various sensors and markers to interact with AR systems. These entities provide tactile, sensory, and stimuli-producing feedback based on user interactions. They are essential for creating immersive AR experiences, allowing users to interact with virtual augmentations in a tangible way. Multifunctional corporal entities can include various components, such as IMUs, capacitive touch sensors, thermal diodes, and olfactory output fans, to simulate a wide range of physical interactions and environmental conditions. These entities enhance the educational and training potential of AR by providing realistic and interactive simulations that closely mimic real-world scenarios.

NFC chips mean near-field communication devices that allow for close-range wireless communication. In AR, NFC chips can trigger specific actions when brought near an AR device, such as initiating a tutorial or displaying detailed information about a corporal entity. NFC chips are commonly used for secure data exchange and can store small amounts of information, making them ideal for applications where quick and easy interaction is required. By integrating NFC chips into corporal entities, AR systems can provide context-sensitive interactions that enhance the user experience and streamline workflows.

Olfactory output fan means a component used to disperse scents in an AR environment. By integrating an olfactory output fan with scented substances, AR systems can provide a complete sensory experience, simulating smells associated with various interactions. This enhances the realism and immersion of the AR experience, making simulations more engaging and informative. The olfactory output fan works by blowing air over a scented material, such as an essential oil or fragrance-infused pad, dispersing the scent into the surrounding area. This component can be controlled to adjust the intensity and duration of the scent, providing a dynamic olfactory experience that complements visual and tactile feedback.

Orientation means the spatial arrangement of an object relative to a reference frame. In AR, tracking the orientation of corporal entities is essential for accurate augmentation. Sensors such as IMUs provide real-time data on the orientation of objects, allowing the AR system to adjust digital overlays to match the physical position and movement of the entity, ensuring a cohesive and immersive experience. Accurate orientation tracking ensures that virtual content remains stable and correctly aligned with the physical world, enhancing the realism and usability of AR applications.

Piezoelectric pressure sensor means a device that generates an electrical signal in response to mechanical stress. In AR, piezoelectric sensors are used to measure the pressure applied to corporal entities, providing data that can be used to simulate real-world interactions such as pressing a pipette. This data ensures that the digital augmentation accurately reflects the user's physical input. Piezoelectric pressure sensors are highly sensitive and can detect even slight changes in pressure, making them ideal for applications that require precise and responsive tactile feedback. By converting mechanical force into electrical signals, these sensors enable AR systems to provide realistic and interactive simulations.

RFID tags mean small devices that use radio waves to transmit data about an object. RFID tags in AR systems can be used to track corporal entities without direct line of sight, providing a reliable method for managing and interacting with physical objects in the virtual environment. RFID tags contain a microchip and antenna that can store and transmit information to RFID readers. This technology allows for quick and efficient identification and tracking of objects, enabling seamless integration and interaction in AR applications. RFID tags can be used to store various types of data, such as the identity, specifications, and interaction history of corporal entities, ensuring accurate and up-to-date information is available for AR systems.

Rotating motor means a device that converts electrical energy into rotational motion. In AR systems, rotating motors like ERM motors are used to simulate tactile feedback, such as the sensation of stirring a liquid in a beaker. The motor's vibrations provide a realistic feel, enhancing the user's interaction with the virtual environment. Rotating motors can be controlled to produce varying intensities and patterns of vibration, simulating different tactile sensations. These motors are often integrated into corporal entities to provide haptic feedback that complements visual and auditory augmentations, making interactions more immersive and engaging.

See-through augmented reality (OST-AR) means a form of AR where digital content is superimposed onto the user's view of the real world using transparent optical combiners. This technology allows users to see both real-world and virtual elements simultaneously. OST-AR devices, like the Microsoft HoloLens, use transparent displays to overlay digital information directly onto the user's line of sight. However, OST-AR often suffers from limitations such as semi-transparent visualizations of virtual objects and smaller display fields of view due to the constraints of optical combiners. Despite these limitations, OST-AR provides a unique way to blend digital content with the physical world, enabling interactive and context-aware applications.

Tactile means relating to or perceptible by touch. In the context of AR, tactile feedback involves the use of haptic technologies to simulate the feel of physical interactions. For example, a corporal entity like a beaker can include capacitive touch sensors to detect where it is being held and provide feedback through vibrations or temperature changes. This feedback helps users understand and react to virtual simulations, such as feeling the heat from a simulated exothermic reaction, thus enhancing the immersive experience. Tactile feedback is crucial for creating realistic and engaging AR experiences, allowing users to interact with virtual content in a natural and intuitive way.

Thermal diode means a component that can emit or absorb heat based on the direction of electrical current flow. In AR systems, thermal diodes are used to simulate temperature changes on corporal entities, providing realistic tactile feedback for reactions such as exothermic or endothermic processes. These diodes can quickly heat up or cool down, simulating the thermal sensations associated with various chemical reactions. By integrating thermal diodes into corporal entities, AR systems can provide a more immersive and interactive experience, allowing users to feel the effects of virtual reactions and processes.

Triangulation means a method for determining the location of an object by measuring angles from known points. In AR, triangulation is used to track the position of corporal entities by using multiple sensors or cameras to measure distances and angles, providing precise spatial data for accurate augmentation. This technique ensures that virtual content remains stable and correctly aligned with the physical world, enhancing the realism and usability of AR applications. Triangulation is particularly useful for tracking the movement and interaction of multiple objects in complex AR environments, providing a robust and reliable method for spatial positioning.

Trilaterate means a method for determining the position of an object by measuring distances from three or more known points. Trilateration is used in AR systems to track corporal entities by using sensors or cameras to measure distances from fixed points, ensuring accurate and reliable positioning for digital overlays. This method provides precise spatial data that is essential for maintaining the alignment and stability of virtual content within the AR environment. Trilateration is commonly used in combination with other tracking techniques to enhance the accuracy and reliability of AR systems, ensuring a seamless and immersive user experience.

Unique identification marker means a machine-readable code that uniquely identifies a physical object. In AR systems, unique identification markers, such as QR codes or RFID tags, are used to track and manage corporal entities. These markers store data about the object's properties and location, enabling the AR system to render appropriate augmentations and maintain accurate interactions. Unique identification markers are essential for ensuring that each corporal entity can be accurately tracked and augmented, providing a reliable method for managing objects within the AR environment. These markers can store various types of information, such as the object's identity, specifications, and interaction history, facilitating seamless integration and interaction in the augmented space.

Video see-through augmented reality (VST-AR) means an AR technology that uses cameras to capture real-world images and then displays these images with digital overlays on a screen in front of the user's eyes. This method contrasts with OST-AR by offering pure opacity for virtual objects and often a wider FOV. Devices like the META QUEST PRO and APPLE VISION PRO utilize VST-AR to provide highly immersive experiences where digital content appears more integrated with the real world. VST-AR systems can more accurately render occlusion and lighting effects, enhancing the realism of the augmented environment. By directly augmenting the pixels of real-world images, VST-AR provides a seamless and realistic integration of virtual and physical elements, making it ideal for a wide range of applications, including education, training, and entertainment.

Wireless transceiver means a device that can both transmit and receive wireless signals. In AR systems, wireless transceivers facilitate communication between corporal entities and AR devices. For instance, a corporal entity equipped with a wireless transceiver can send data about its orientation and interaction status to the AR device, ensuring real-time updates and accurate augmentation. This wireless communication is essential for creating interactive and responsive AR experiences. Wireless transceivers enable seamless data exchange between components, allowing for dynamic and synchronized interactions within the augmented environment.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An augmented reality, AR, apparatus comprising:
   a) a video see-through AR, VST-AR, device configured to capture images of a real-world environment and display augmented versions of those images on a display screen;
   b) a corporal entity comprising a physical analog of an otherwise empty laboratory vessel, wherein the corporal entity further comprises an inertial measurement unit, IMU, physically affixed to the vessel and communicatively coupled to the at least one processor, the IMU including an accelerometer, gyroscope, and magnetometer to detect the orientation and movement of the vessel thereby providing data to the at least one processor for dynamic adjustment of the visual augmentations; and
   c) a spatial registration module accessible by at least one processor wherein a registration indicium captured by the VST-AR device conveys a spatial position and orientation of the vessel in real-time to the processor wherein the at least one processor generates visual augmentations to the display, the augmentations representing virtual matter present within the vessel.

2. The AR apparatus of claim 1 wherein the virtual matter is rendered as a liquid.

3. The AR apparatus of claim 2 wherein the augmentations of the liquid are re-rendered to the display in real time responsive to changes in the spatial position or orientation of the physical manifestation of the vessel.

4. The AR apparatus of claim 1 wherein the registration indicium is a machine-readable code affixed to the vessel and optically retrieved by the VST-AR device.

5. The AR apparatus of claim 1 wherein the registration indicium comprises a plurality of infrared lights affixed to the vessel and optically retrieved by the VST-AR device.

6. The AR apparatus of claim 1, wherein the registration indicium is a machine-readable code affixed to the vessel and optically retrieved by the VST-AR device to initialize the spatial position and orientation of the vessel and then subsequently the IMU conveys changes in the spatial position and orientation whereby subsequent optical occlusion of the code does not impact the ability of the VST-AR device to render visual augmentations for new positions and orientations of the vessel.

7. The AR apparatus of claim 1, further comprising capacitive tactile sensors communicatively coupled to the at least one processor, the sensors affixed to an exterior of the vessel to detect user touch thereby providing feedback to the VST-AR device for enhancing the visual augmentations with tactile responses.

8. The AR apparatus of claim 1, further comprising a thermal diode integrated into the vessel to simulate temperature changes and provided tactile feedback representing exothermic or endothermic reactions in synchronization with the visual augmentations.

9. The AR apparatus of claim 1, further comprising an olfactory output fan within the vessel to emit scents in synchronization with the visual augmentations.

10. The AR apparatus of claim 1, further comprising an eccentric rotating mass, ERM, motor disposed within the vessel to generate vibrations, simulating tactile sensations of stirring or mixing fluids in synchronization with the visual augmentations.

11. The AR apparatus of claim 1, further comprising a sound output in conjunction with the display, the sound output configured to emit audio corresponding to the visual augmentations.

12. The AR apparatus of claim 1, further comprising a fluid flow system including a fluid reservoir and a bidirectional pump to send real, physical fluid to and from the vessel in synchronization with visual augmentations of virtual fluids shown on the display.

13. The AR apparatus of claim 12 wherein the vessel retains the fluids impermeably as they are pumped in or out by the bidirectional pump wherein spilling of the physical fluid by reorientation of the vessel into an inverted state is not possible.

14. An augmented reality, AR, apparatus comprising:
   a) a video see-through AR, VST-AR, device configured to capture images of a real-world environment and display augmented versions of those images on a display screen;
   b) a corporal entity comprising a physical analog of an otherwise empty laboratory vessel;
   c) an identification marker affixed to the vessel, the marker uniquely associated with at least the type of vessel, the VST-AR device configured to capture and decode the marker;
   d) at least one processor communicatively coupled to the VST-AR device and further communicatively coupled to a data store, the data store using the decoded marker as a key to retrieve operational parameters from the data store that define how an augmentation of the vessel by the VST-AR is rendered to the display screen, wherein virtual matter is rendered as a liquid and an operational parameter is viscosity whereby the augmentation of the virtual matter as the liquid further conveys the liquid's viscosity based on simulated fluid dynamics; and
   e) a spatial registration module accessible by the at least one processor wherein a registration indicium captured by the VST-AR device conveys distance and orientation of the vessel in real-time to the processor wherein the at least one processor generates visual augmentations to the display, the augmentations representing the virtual matter present within the vessel.

15. The AR apparatus of claim 14 wherein an operational parameter is exothermal reactivity whereby the augmentation of the virtual matter as a liquid changes the visual appearance of the matter according to the exothermal reactivity parameter.

16. The AR apparatus of claim 15, further comprising a thermal diode integrated into the vessel whereby an exothermic reaction is simulated by increasing the heat of the vessel by the thermal diode based on the exothermal reactivity parameter in synchronization with the visual augmentations.

17. The AR apparatus of claim 14, further comprising an olfactory output fan within the vessel to emit scents in synchronization with the visual augmentations according to an olfactory operational parameter.

18. The AR apparatus of claim 14, further comprising an eccentric rotating mass, ERM, motor disposed within the vessel to generate vibrations, simulating tactile sensations of stirring or mixing fluids in synchronization with the visual augmentations.

19. The AR apparatus of claim 14, further comprising a sound output in conjunction with the display, the sound output configured to emit audio corresponding to the visual augmentations.

20. The AR apparatus of claim 14, further comprising a fluid flow system including a fluid reservoir and a bidirectional pump to send real, physical fluid to and from the vessel in synchronization with visual augmentations of virtual fluids shown on the display.

21. The AR apparatus of claim 20 wherein the vessel retains the fluids impermeably as they are pumped in or out by the bidirectional pump wherein spilling of the physical fluid by reorientation of the vessel into an inverted state is not possible.

22. An augmented reality, AR, apparatus comprising:
   a) a video see-through AR, VST-AR, device configured to capture images of a real-world environment and display augmented versions of those images on a display screen;
   b) a laboratory instrument comprising a physical object with integrated sensors and markers for AR enhancement, wherein the laboratory instrument is a micropipette and further comprises capacitive tactile sensors affixed to the laboratory instrument to detect user touch and grip, piezoelectric pressure sensors to measure the force applied during liquid transfer, and a mechanical pressure sensor to provide precise feedback on the amount of pressure exerted on the pipette tip;
   c) an identification marker affixed to the laboratory instrument, the marker uniquely associated with the laboratory instrument, the VST-AR device configured to capture and decode the marker;
   d) at least one processor communicatively coupled to the VST-AR device and further communicatively coupled to a data store, the data store using the decoded marker as a key to retrieve operational parameters from the data store that define how an augmentation of the laboratory instrument by the VST-AR is rendered to the display screen; and
   e) a spatial registration module accessible by the at least one processor wherein the unique identification marker optically captured by the VST-AR device conveys distance and orientation of the laboratory instrument in real-time to the processor wherein the at least one processor generates visual augmentations to the display, the augmentations corresponding to the laboratory tasks performed with the instrument.

* * * * *